(12) United States Patent
Van Loon et al.

(10) Patent No.: US 6,713,082 B2
(45) Date of Patent: Mar. 30, 2004

(54) COMPOSITION COMPRISING CARBOHYDRATE AND PEPTIDE MATERIAL AND ITS USE AS AN ENERGY SUPPLEMENT AFTER OR DURING PHYSICAL EXERCISE OR AS A METABOLIC NUTRIENT FOR ORAL CONSUMPTION

(75) Inventors: Lucas J.C. Van Loon, Maastricht (NL); Antonius A.J. Wagenmakers, Valkenburg (NL); Andries D. Siemensma, Leeuwarden (NL); Anthonie Kunst, Huizen (NL); Marcellinus J.J. Hakkaart, Hilversum (NL); Withelmus H.M. Saris, Meerssen (NL)

(73) Assignee: Quest International B.V., Naarden (NL)

( * ) Notice: Subject to any disclaimer, the term of this patent is extended or adjusted under 35 U.S.C. 154(b) by 0 days.

(21) Appl. No.: 09/750,031

(22) Filed: Dec. 29, 2000

(65) Prior Publication Data
US 2001/0031729 A1 Oct. 18, 2001

(30) Foreign Application Priority Data
Dec. 30, 1999 (EP) ............................................. 99204607

(51) Int. Cl.⁷ .......................... A61K 35/20; A61K 38/00
(52) U.S. Cl. ....................... 424/439; 424/520; 424/535; 424/725; 514/2; 514/23

(58) Field of Search .............................. 424/725, 175.1, 424/601, 650, 439, 520, 525, 535; 514/2, 23, 866, 168

(56) References Cited

U.S. PATENT DOCUMENTS

| | | | |
|---|---|---|---|
| 4,042,688 A | | 8/1977 | Gans et al. |
| 5,776,887 A | * | 7/1998 | Wibert et al. |
| 6,051,236 A | * | 4/2000 | Portman |

FOREIGN PATENT DOCUMENTS

| | | |
|---|---|---|
| EP | 0 418 593 A2 | 3/1991 |
| EP | 0 421 309 A2 | 4/1991 |
| FR | 2 710 244 A | 3/1995 |
| GB | 913790 | 12/1962 |
| JP | 61 215323 | 9/1986 |
| WO | WO 95/22909 | 8/1995 |
| WO | WO 97/39641 | 10/1997 |

* cited by examiner

Primary Examiner—Leon B. Lankford, Jr.
Assistant Examiner—Ruth A. Davis
(74) Attorney, Agent, or Firm—Fitch, Even, Tabin & Flannery

(57) ABSTRACT

The invention relates to a composition comprising carbohydrate and peptide material as well as an amount of at least one additional free amino acid selected from the group consisting of leucine and phenylalanine. This composition will enhance the blood insulin response after oral intake by humans and is intended for an enhanced recovery after physical exercise or to delay exhaustion during physical exercise.

25 Claims, No Drawings

COMPOSITION COMPRISING CARBOHYDRATE AND PEPTIDE MATERIAL AND ITS USE AS AN ENERGY SUPPLEMENT AFTER OR DURING PHYSICAL EXERCISE OR AS A METABOLIC NUTRIENT FOR ORAL CONSUMPTION

The invention relates to a composition comprising carbohydrate and peptide material, which enhance the blood insulin response after oral intake and intended for an enhanced recovery after physical exercise or to delay exhaustion during physical exercise. Further the invention relates to a metabolic nutrient for oral consumption.

BACKGROUND OF THE INVENTION

WO 97/39641 discloses an energy supplementation product in the form of a beverage or other nutrient for athletes or other persons in need of an increased glycogen level. This product is characterized by on the one hand a protein hydrolysate having a degree of hydrolysis (DH) of 1–50, preferably 15–30 and most preferably about 25 and on the other hand a carbohydrate like glucose, sucrose, maltose or a maltodextrine. In said WO 97/39641 it is stated that the intake of the energy supplementation product causes an increased insulin secretion enhancing the resynthesis of muscle glycogen. The rate of resynthesis of muscle glycogen after exercise is an important factor determining the time needed for recovery of the athlete. This is especially important for athletes involved in intensive exercise on a daily basis. However, it appeared that after exercise of the athlete to exhaustion a protein hydrolysate will not enhance significantly the plasma insulin response upon a carbohydrate load.

OBJECTS AND SUMMARY OF THE INVENTION

It is an aim of the present invention to provide a good tasting and refreshing composition that can be taken orally and that stimulates the plasma insulin response. Taken after exercise the resulting enhanced insulin response highly stimulates muscle glycogen synthesis and thus recovery. Furthermore, protein anabolism in skeletal muscles is stimulated. Taken during exercise an enhanced uptake of glucose by the muscles would occur. This aim may be realised by providing a composition comprising carbohydrate and peptide material and an amount of at least one additional free amino acid selected from the group consisting of leucine and phenylalamine.

DETAILED DESCRIPTION OF THE INVENTION

As indicated above the composition according to the invention comprises carbohydrate and peptide material and at least one of the additional free amino acids leucine and/or phenylalamine, preferably both. Said additional free amino acids are each present in an amount of 0.2–20 wt. %, preferably 1–10 wt. %, calculated on the dry weight of the composition.

Next to the above additional free amino acids it is possible to use the further additional free amino acids arginine and/or glutamine which each may be present in an amount in the range of 0.1–20 wt. % calculated on the dry weight of the composition.

The peptide material can be derived from proteins of animal or plant origin and examples of such proteins are milk proteins, meat proteins, soy proteins, wheat proteins, pea proteins, rice proteins and maize proteins. Preferably the protein raw material is wheat gluten protein or a subfraction thereof such as gliadin. In the present context, the term "peptide material" is understood to indicate a protein hydrolysate and may contain all types of peptides that may vary in length as well as a certain amount of free amino acids resulting from the hydrolysis. The protein raw material is hydrolysed by one or more hydrolytic enzymes. The hydrolytic enzyme can be of animal, plant, yeast, bacterial or fungal origin. Preferably enzyme preparations are used which have a low exo-peptidase activity to minimise the liberation of free amino acids and to improve taste profiles of the protein hydrolysates. The preferred hydrolysed protein material of the present invention has an average peptide chain length in the range of 2–40 amino acid residues and more preferably in the range of 3–20 amino acid residues. The average peptide chain can be determined using the method as described in WO 96/26266. The protein hydrolysates that can be used to prepare a composition as disclosed in the present invention are not limited to ones disclosed in the present invention but include all protein hydrolysates that can be obtained by enzymatic hydrolysis using common techniques as described in the literature and known to those skilled in the art. Further the peptide material is present in an amount of 0.1–50 wt. %, preferably 2–25 wt. %, calculated on dry matter basis of the composition.

The carbohydrate material component of the composition according to the invention is advantageously selected from the group consisting of mono-, di- and polysaccharides like glucose, sucrose, maltose as well as more complex edible carbohydrates such as maltodextrines. Independent on the type of carbohydrate material it is present in an amount in the range of 10–90 wt. %, preferably 50–80 wt. %, calculated on dry matter basis of the composition.

Other optional components of the composition according to the invention are vitamins, minerals, flavours, antioxidants, components having co-enzyme and antioxidant properties, lipids including emulsifiers, and proteins for meeting specific nutritional and/or physiological needs.

The composition according to the invention may have the form of a powder, a beverage or any other food product. A beverage according to the invention can be prepared by dissolving the above-defined ingredients in an appropriate amount of water. Preferably an isotonic drink has been prepared. For drinks, intended to be used during and after exercise it is recommended to have a concentration of the composition according to the invention in the range of 10–15 wt. % calculated on the total weight of the drink.

In view of the complexicity of the processes dealing with the recovery of athletes after (exhaustive) exercise the following is remarked.

Athletes undergoing intense, prolonged training or participating in endurance races (e.g. the marathon) easily catch a cold or flu. This is most probably related to the significant decreased plasma levels of the amino acid glutamine seen during recovery after exercise at exhaustion. A marked increase in numbers of white blood cells occurred immediately after exhaustive exercise, followed by a decrease in the numbers of lymphocytes. The amino acid glutamine is essential for the optimal functioning of a number of tissues in the body, particularly of the immune system and the gut. The provision of oral glutamine after exercise appeared to have a beneficial effect on the level of subsequent infections. In addition, the activity of T-lymphocytes appeared to be increased in samples from those who received glutamine compared with placebo. If recovery between exercise bouts is inadequate, the acute effects of exercise on plasma glutamine level may be cumulative, since overload training has been shown to result in low plasma glutamine levels requiring prolonged recovery. Plasma glutamine level may be useful as an indicator of an overtrained state. As free glutamine is not stable in solution during pasteurisation and during storage, glutamine-containing peptides are the preferred glutamine source. Glutamine containing peptides can be obtained from the hydrolysis of vegetable and animal proteins, a preferred protein source is wheat gluten since this is rich in glutamine. Infections also are an important cause of morbidity and mortality in patients with multiple trauma. Studies in both animals and human beings have suggested that glutamine-enriched nutrition decreases the number of infections. In patients with multiple trauma receiving glutamine-supplemented enteral nutrition a low frequency of pneumonia, sepsis, and bacteraemia was seen.

In addition to its direct action on the cells of the immune system, glutamine may indirectly influence the immune system by the preservation of action of the antioxidant glutathione. The tripeptide glutathione (GSH) is the major intracellular antioxidant and is essential to normal cell function and replication. Studies over the last decade have demonstrated that glutamine becomes essential during metabolic stress to replete tissue GSH levels which have become depleted. The availability of glutamine appears to be important for the regeneration of GSH stores. Due to the high intake of oxygen during physical exercise there is an increased production of radicals and other forms of reactive oxygen species (ROS) in the muscle. ROS has been implicated as an underlying cause in exercise-induced disturbances in muscle homeostasis (e.g. redox status), that could result in muscle fatigue or injury. Important nonenzymatic antioxidant defences include GSH, vitamin E, vitamin C, α-lipoic acid, carotenoids, polyphenols including flavonoids and isoflavones, uric acid, bilirubin, and ubiquinone. α-Lipoic acid functions as a cofactor for α-dehydrogenase complexes and participates in the oxidative decarboxylation of α-keto acids such as pyruvate, α-ketoglutarate and branched chain α-keto acids. Normally, α-lipoic acid is present in small quantities in animal tissues and is generally bound to an enzyme complex and is therefore unavailable as an antioxidant. However, exogenous free unbound α-lipoic acid may be effective as an antioxidant and an recycling vitamin C, which increases the intracellular GSH concentration. Dietary supplementation with antioxidants has been shown to be beneficial in combating oxidative stress without enhancing performance while GSH levels were found to influence the endurance capacity of athletes.

A further aspect of the glucose uptake during and after exercise is elucidated below. In fact numerous factors determine the rate of glucose uptake during and after exercise. During exercise, one of the most important regulatory responses is an increase in blood flow to the contracting skeletal muscles. This increased blood flow provides ample substrate to the working muscles, and thus, glucose availability is usually not the rate-limiting factor for glucose utilisation. Instead, glucose transport is thought to be the rate-limiting step in glucose during exercise. Glucose transport occurs primarily by facilitated diffusion, an energy-independent process that uses GLUT-4, the major glucose carrier in human and rat skeletal muscle for transport of glucose across the plasma membrane. Both exercise and insulin increase glucose transport through an increase in the maximal velocity of transport. This increase in transport may occur through an increase in the rate that each GLUT-4 protein transport glucose (transport turnover number), an increase in the number of functional glucose transporter proteins present in the plasma membrane, or both. It appears that exercise and insulin recruit distinct GLUT-4-containing vesicles and/or mobilise different "pools" of GLUT-4 proteins in skeletal muscle originating from unique intracellular locations. The combined intake of carbohydrates and protein hydrolysates, peptides and/or amino acids will enhance the uptake of glucose during exercise by recruiting different GLUT-4 proteins to the plasma membrane of the contracting muscle cells. As a result the performance of the active muscles is enhanced and exhaustion will be delayed.

Experimental

In studies presented below the effects of intact casein, several protein hydrolysates and protein hydrolysate in combination with specific amino acids have been examined. The sodium casein used in this study is commercially available from DMV-International. Glucose and maltodextrin were obtained from AVEBE (the Netherlands) and crystalline amino acids from BUFA (the Netherlands). In the presented study the following commercially available protein hydrolysates from Quest-International have been used: Hyprol® 3301 (whey protein hydrolysate, average peptide chain length of 4.1), Hyprol® 4107 (wheat gluten protein hydrolysate, average peptide chain length of 12.2) and Hyprol® 7102 (pea protein hydrolysate, average peptide chain length of 6.4). The insulin responses in blood plasma was analysed by radio-immuno-assay (Insulin RIA 100 kit, Pharmacia, Sweden).

In three studies the efficiency of an amino acid and/or protein (hydrolysate) mixture in a carbohydrate containing drink with respect to their insulinotropic effect in human subjects was examined. The composition of all the tested experimental drinks are given in table 1.

First Study

The aim of the first study was to establish an amino acid and/or protein (hydrolysate) mixture with a maximal insulinotropic effect when co-ingested with carbohydrates.

Eight healthy, non-obese male subjects (age 21±0.4, weight 73.9±2.2 kg, height 186±2 cm, BMI 21.4±0.7 kg·m$^{-2}$) after an overnight fast, were tested for 2 hours on 10 occasions in which different beverage compositions were ingested. During those trials subjects ingested 0.8 g·kg bw$^{-1}$·h$^{-1}$ carbohydrate and 0.4 g·kg bw$^{-1}$·h$^{-1}$ of an amino acid and/or protein (hydrolysate)-mixture. When the mixture of free amino acids and protein hydrolysate was tested, 0.2 g·kg bw$^{-1}$·h$^{-1}$ wheat gluten protein hydrolysate, 0.1 g·kg bw$^{-1}$·h$^{-1}$ leucine and 0.1 g·kg bw$^{-1}$·h$^{-1}$ phenylalanine was consumed. The drinks were ingested at a rate of 3.5 ml·kg bw$^{-1}$ per half-hour. A strong initial increase in plasma glucose and insulin levels was observed in all trials after which large differences in insulin response between drinks became apparent. The insulin response is expressed as area under the curve during the second hour. It was found that the ingestion of the drinks containing free leucine, phenylalanine and arginine and the drinks with free leucine, phenylalanine and wheat protein hydrolysate was followed by the largest insulin response (201 and 203%, respectively; P<0.05) compared to the carbohydrate-only drink (see Table 1). The insulin responses correlated positively with plasma leucine, phenylalanine and tyrosine levels. The positive correlation observed with plasma tyrosine levels may be explained by the fact that the amino acid tyrosine is the hydroxylation product of phenylalanine in the liver and is formed when large amounts of phenylalanine are ingested. Ingestion of a test drink containing large amounts of free arginine (0.4 g arginine·kg bw$^{-1}$·h$^{-1}$) caused severe diarrhoea and the urge to defecate in all subjects for several hours during and after the trial. These gastrointestinal problems appeared to prevent intestinal absorption of the arginine as lower concentrations of arginine were seen in plasma following ingestion of other arginine containing test drinks. This indicates that in sports practice it would not be recommendable to ingest large amounts of arginine in order to stimulate growth hormone release and muscle anabolism.

The addition of glutamine to the mixture of arginine, leucine and phenylalanine had no effect on the insulin response; this suggests that, at least in the studied healthy men, in vivo enough glutamine is present, at least in the studied healthy men (600–800 $\mu$mol·l$^{-1}$ in plasma). Also the addition of free glutamine hardly influenced plasma glutamine concentrations. The drink containing the wheat gluten protein hydrolysate (drink 5) gave the highest insulin response of all tested protein hydrolysates. Although no statistical significant differences were found between the insulin responses in test drinks containing whey, pea and wheat hydrolysate vs. the control carbohydrate-only trial, the mean insulin responses were 155, 125 and 181%, respectively, compared to the control trial. There were no differences in plasma leucine and phenylalanine responses between the different protein hydrolysates tested. None of the hydrolysates gave rise to gastrointestinal or other complaints. Furthermore, the insulin responses on the ingestion of the drink containing the free amino acids leucine, phenylalanine and arginine (drink 6), the drink containing the mentioned three amino acids as well as glutamine (drink 7), as well as the drink containing wheat gluten protein hydrolysate and the free amino acids leucine and phenylalanine (drink8) were the same (table 1).

The main conclusion is that oral intake of amino acids in combination with carbohydrates can result in an insulinotropic effect as large as 200% compared to the intake of carbohydrates only. Furthermore, a mixture of free leucine, phenylalanine and arginine can produce a large insulinotropic effect when ingested in combination with carbohydrates. Surprisingly, the addition of leucine and phenylalanine to a wheat gluten protein hydrolysate created a similar insulinotropic effect as the drinks containing arginine (drink 6) but without any gastrointestinal discomfort. Following the ingestion of the intact protein (drink 2) plasma amino acid responses were in general lower compared to the responses observed following ingestion of protein hydrolysates. Therefor the use of protein hydrolysates is preferred in order to stimulate insulin secretion. Another practical disadvantage of the use of an intact protein when ingested as a drink is its poor solubility in water.

Second Study

In the second study the correlation between glucose and insulin responses after oral intake of the composition of the first study (wheat gluten protein hydrolysate, free leucine, phenylalanine and carbohydrate) with respect to the post-exercise muscle glycogen synthesis was examined. This study investigated whether an increase in carbohydrate intake and/or ingestion of a protein hydrolysate/amino acid mixture in combination with carbohydrate can increase post-exercise muscle glycogen synthesis rates when compared to the ingestion of 0.8 g·kg bw$^{-1}$·h$^{-1}$ carbohydrate, provided at 30-min intervals. (In Appl. Physiol., 1988 64(4) 1480 it is reported that in healthy athletes a maximum glycogen resynthesis rate is obtained upon ingestion of about 0.75 g·kg bw$^{-1}$·h$^{-1}$).

Eight trained cyclists (age: 24.0±0.6 years, body mass: 70.0±1.0 kg, BMI: 21.4±0.6 m·kg$^{-2}$) visited the laboratory 3 times during which a control and 2 other beverage compositions were tested. The subjects were subjected to a glycogen depletion protocol in which they cycled in two-minute block periods at alternating workload of 90 and 50% of their maximum performance capacity (maximum workload (Wmax): 390±8 W, maximum heart rate; 191±3 bts·min$^{-1}$). This was continued until the subjects were no longer able to complete the two-minutes at 90% of their maximum. Subjects were allowed to stop when pedalling speed could not be maintained at 70% of their maximum capacity. After they had stopped muscle biopsy samples were collected and subjects received a beverage every 30 min to ensure ingestion of 0.8 g·kg bw$^{-1}$·h$^{-1}$ carbohydrate (CHO, drink 1), 0.8 g·kg bw$^{-1}$·h$^{-1}$ carbohydrate+0.4 g·kg bw$^{-1}$·h$^{-1}$ wheat protein hydrolysate+free leucine and phenylalanine (CHO+PRO, drink 8) or 1.2 g·kg bw$^{-1}$·h$^{-1}$ carbohydrate (CHO+CHO, drink 10). After 5 hours a second biopsy was taken. Plasma insulin responses in the CHO+PRO (drink 8) and CHO+CHO trial (drink 10) were increased (table 1) compared to the CHO trial (drink 1) (+88±17 and +46±18% respectively; P<0.05). Muscle glycogen synthesis was increased in both treatments compared to the CHO trial (+35.4±5.1 and +44.8±6.8 vs. 16.6±7.8 $\mu$mol glycosyl units·g dw$^{-1}$·h$^{-1}$, respectively: P<0.05).

Surprisingly, the high carbohydrate drink (CHO+CHO, drink 10) stimulated the highest glycogen synthesis in skeletal muscle but the CHO+PRO (drink 8) has the highest plasma insulin response. This suggests that the amount of glucose is limiting in the drink 8, which is the same as the control (drink 1), the amount of glucose is limiting for glycogen synthesis and indicates that post exercise ingestion of 0.8 g·kg bw$^{-1}$·h$^{-1}$ carbohydrate is not the maximum as is generally accepted with respect to glucose absorption as is generally accepted. More glucose can be absorbed as is shown by drink 10 which provides an intake of even 1.2 g·kg bw$^{-1}$·h$^{-1}$ carbohydrate.

Third Study

To investigate the insulinotropic effect of protein hydrolysates and leucine and phenylalanine in combination at the high carbohydrate intake of 1.2 g·kg bw$^{-1}$·h$^{-1}$, a third study was performed in highly trained athletes. Here, the post-exercise insulin response as well as the plasma amino acid response following the combined ingestion of carbohydrate and wheat gluten protein hydrolysate with and without the addition of free leucine and phenylalanine in trained athletes was examined. After an overnight fast, 8 male cyclists (age; 24.0±0.6 years, body mass; 70.0±1.0 kg, BMI: 21.4±0.6 m·kg$^{-2}$) on 5 occasions were subjected to a glycogen depletion protocol. Thereafter a control drink and 2 different beverage compositions in 2 different doses were tested. After performing the glycogen depletion protocol (see 2$^{nd}$ study) subjects received a beverage volume of 3.5 ml·kg bw$^{-1}$ every 30 minutes to ensure an intake of 1.2 g·kg bw$^{-1}$·h$^{-1}$ carbohydrate and 0, 0.2 or 0.4 g·kg bw$^{-1}$·h$^{-1}$ protein hydrolysate/amino acid mixture. The insulin response is expressed as area under the curve. It was found that the ingestion of the beverages containing wheat hydrolysate, free leucine and phenylalanine resulted in a substantial increase in insulin response (+52 and +107%, respectively P<0.05) compared to the control (carbohydrate only) trial (table 1). A dose related effect exists as doubling the dose (0.2 to 0.4 g·kg bw$^{-1}$·h$^{-1}$) lead to an additional rise in insulin response (P<0.05).

In contrast to our first study with subjects after an overnight fast, we found no significant increase in post-exercise insulin response following the ingestion of a wheat gluten protein hydrolysate at an intake of 0.2 or 0.4 g·kg bw$^{-1}$·h$^{-1}$ in combination with carbohydrate at 1.2 g·kg bw$^{-1}$·h$^{-1}$ compared with the control (carbohydrate-only) drink. This can partly be explained by the higher carbohydrate intake (1.2 vs. 0.8 g·kg bw$^{-1}$·h$^{-1}$) that was applied in the third study. Furthermore, this third study was performed following intense exercise and the insulin response is likely to be reduced as muscle contraction stimulates glucose transport, largely mediated by translocation of GLUT4 from intracellular sites to the plasma membrane as discussed earlier. Surprisingly we found that a substantial increase in insulin response is seen following the ingestion of the mixtures containing wheat gluten protein hydrolysate together with free leucine and phenylalanine when compared to the control (P<0.05). Ingestion of 0.2 and 0.4 g·kg bw$^{-1}$·h$^{-1}$ of this mixture in combination with carbohydrate resulted in an additional increase in insulin response of 51.8±9.5 and 107.4±16.7%, respectively compared to the control trial (P<0.05).

As both glucose availability and insulin concentrations determine the rate of glucose uptake in skeletal muscle, increasing postexercise insulin levels could have practical importance for the optimisation of glycogen synthesis rates and protein metabolism in skeletal muscle.

TABLE 1

Composition of used test drinks and their insulinotropic effects.
The values in the table are given in gram dry product per 100 ml drink.

| Test drink | 1 | 2 | 3 | 4 | 5 | 6 | 7 | 8* | 9* | 10 | 11 | 12 | 13 | 14* | 15* |
|---|---|---|---|---|---|---|---|---|---|---|---|---|---|---|---|
| Intact casein | | 5.71 | | | | | | | | | | | | | |
| Whey protein hydrolysate | | | 5.71 | | | | | | | | | | | | |
| Pea protein hydrolysate | | | | 5.71 | | | | | | | | | | | |
| Wheat protein hydrolysate | | | | | 5.71 | | | 2.86 | 2.86 | | | 2.86 | 5.71 | 1.43 | 2.86 |
| Leucine | | | | | | 1.90 | 1.43 | 1.43 | 0.95 | | | | | 0.71 | 1.43 |
| Phenylalanine | | | | | | 1.90 | 1.43 | 1.43 | 0.95 | | | | | 0.71 | 1.43 |
| Arginine | | | | | | 1.90 | 1.43 | | 0.95 | | | | | | |
| Glutamine | | | | | | | 1.43 | | | | | | | | |
| Glucose | 5.71 | 5.71 | 5.71 | 5.71 | 5.71 | 5.71 | 5.71 | 5.71 | 5.71 | 8.57 | 6.85 | 6.85 | 6.85 | 6.85 | 6.85 |
| Maltodextrin | 5.71 | 5.71 | 5.71 | 5.71 | 5.71 | 5.71 | 5.71 | 5.71 | 5.71 | 8.57 | 10.28 | 10.28 | 10.28 | 10.28 | 10.28 |
| Sodium saccharinate | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| Citric acid | 0.18 | 0.18 | 0.18 | 0.18 | 0.18 | 0.18 | 0.18 | 0.18 | 0.18 | 0.18 | 0.18 | 0.18 | 0.18 | 0.18 | 0.18 |
| Cream vanilla flavour | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| 1$^{st}$ Study | Plasma insulin response (area under curve minus baseline values): mean ± SEM (mU · ml$^{-1}$ · 2 hrs)** | | | | | | | | | | | | | | |
| Healthy male subjects | 4.61 ± 0.68 | 5.10 ± 1.44 | 6.64 ± 1.01 | 5.15 ± 0.37 | 7.33 ± 1.19 | 7.24 ± 1.15 | 7.16 ± 1.49 | 7.10 ± 0.59 | 6.56 ± 0.86 | | | | | | |
| Overnight fact | Plasma insulin response (area under curve minus baseline values); mean ± SEM (mU · ml$^{-1}$ · 2$^{nd}$ hr)*** | | | | | | | | | | | | | | |
| | 2.53 ± 0.37 | 3.30 ± 1.05 | 3.93 ± 0.56 | 3.16 ± 0.17 | 4.59 ± 0.86 | 5.08 ± 0.88 | 4.61 ± 0.96 | 5.14 ± 0.35 | 4.28 ± 0.62 | | | | | | |
| 2$^{nd}$ Study | Plasma insulin response (area under curve minus baseline values): mean ± SEM (mU · ml$^{-1}$ · 5 hrs) | | | | | | | | | | | | | | |
| Males athletes Post exercise | 8.58 ± 0.86 | | | | | | | | 15.89 ± 2.21 | | 12.27 ± 1.94 | | | | |
| 3$^{rd}$ Study | Plasma insulin response (area under curve minus baseline values): mean ± SEM (mU · ml$^{-1}$ · 3 hrs) | | | | | | | | | | | | | | |
| Male athletes Post exercise | | | | | | | | | | | 5.91 ± 1.02 | 5.82 ± 0.42 | 5.83 ± 0.60 | 8.42 ± 0.78 | 11.32 ± 1.00 |

*drinks according to the invention
**average over two hours
***average over the second hour In case of the dry powder version of the composition of the present invention it is preferred to use agglomerated ingredients or to agglomerate the whole composition in order to facilitate the rehydration process. The following, non-limiting examples illustrate the embodiments according to the invention.

EXAMPLE 1

The composition as shown in table 2 was chosen such that the finally obtained drink is isotonic. Hyprol® 4107 is a wheat gluten protein hydrolysate from Quest-International. One litre of drink was prepared by dissolving 177.4 gram of the powder in an appropriate amount of water. The drink was found to be good tasting and refreshing.

TABLE 2

Composition of tropical sports drink.

| Ingredients | Powder composition g/kg | Composition of drink % |
|---|---|---|
| Maltodextrin | 430.70 | 7.64 |
| Sugar extra fine | 225.12 | 3.99 |
| Hyprol ® 4107 | 140.93 | 2.50 |
| Leucine | 70.47 | 1.25 |
| Phenylalanine | 70.47 | 1.25 |
| Aspartame | 1.40 | 0.02 |
| Citic acid powder | 37.21 | 0.66 |
| Orange Flavour | 5.21 | 0.09 |
| Tropical Flavour | 6.79 | 0.12 |
| Carotenoids | 0.56 | 0.01 |
| Clouding agent | 7.44 | 0.13 |
| Tricalcium phosphate | 3.72 | 0.07 |
| Total | 1000.00 | 17.74 |

EXAMPLE 2

A composition as shown in table 3 was chosen such that the finally obtained drink is isotonic. Hyprol® 4107 is a wheat gluten protein hydrolysate from Quest-International. One litre of drink was prepared by dissolving 165 gram of the powder in an appropriate amount of water. The drink was found to be good tasting and refreshing.

TABLE 3

Composition of strawberry sports drink

| Ingredients | Powder composition g/kg | Composition of drink % |
|---|---|---|
| Maltodextrin | 445.18 | 7.39 |
| Sugar extra fine | 221.69 | 3.68 |
| Hyprol ® 4107 | 150.60 | 2.50 |
| Leucine | 75.30 | 1.25 |
| Phenylalanine | 75.30 | 1.25 |
| Aspartame | 1.82 | 0.03 |
| Citrio acid | 19.88 | 0.33 |
| Strawberry flavour | 1.82 | 0.03 |
| Caramel | 1.21 | 0.02 |
| Cochineal (colour) | 1.82 | 0.03 |
| α-Lipoic acid | 3.61 | 0.06 |
| Vitamin C | 1.21 | 0.02 |
| Isoflavones (soy) | 0.60 | 0.01 |
| Total | 1000.0 | 16.60 |

EXAMPLE 3

Stable liquid enteral feeding for use in hospital and at home, containing both protein hydrolysate and fat (5%). Hyprol® 7102 is a pea protein hydrolysate from Quest-International. Also vitamins and calcium are added. The antioxidants α-lipoic acid, flavonoids, carotenoids and the vitamins E and C are included.

TABLE 4

Composition of liquid enteral feeding

| Ingredients | Composition of drink |
|---|---|
| 30% fat emulsion NN-26751 | 175.00 g |
| Maltodextrine 27057 | 90.00 g |
| Aspartame | 0.20 g |
| Citric acid solution 50% w/w | 3.20 ml |
| Ascorbic acid | 0.20 g |
| Vegetable protein Hyprol ® 7102. 5 Z10418 | 20.00 g |
| Leucine | 10.00 g |
| Phenylalanine | 10.00 g |
| Calcium lactate 5 aq. | 3.90 g |
| Vitamin pre-mix 961* | 0.20 g |
| Orange Compound Coloured QL-2319 | 22.50 g |
| Tropical NN-20325 | 1.50 g |
| α-Lipoic acid | 0.60 g |
| Flavonoids (grape seed extract) | 0.20 g |
| Colours (E160 a + E160 c) | 8 mg |
| With water up to | 1000 ml |

*At the given dosage, the vitamin mix contains the RDA amounts for Vitamins $B_1$, $B_2$, $B_3$, $B_5$, $B_6$, $B_{11}$, $B_{12}$, C, E, and H per litre final drink

EXAMPLE 4

Nougat bar centre for a sports bar. The casein hydrolysate Hyfoama® DSN and the wheat gluten protein hydrolysate Hyprol® 4107 are both products from Quest-International. The nougat bar centres makes about 40% in weight from a sports bar, 20% can be caramel and 40% of the bar exists out of a chocolate outside.

TABLE 5

Composition of nougat sports bar centre

| Ingredients | Composition |
|---|---|
| Sugar | 375 g |
| Glucose (35DE) | 359 g |
| Icing sugar | 11 g |
| Skimmed milkpowder | 43 g |
| Hyprol ® 4107 | 20 g |
| Leucine | 10 g |
| Phynylalanine | 10 g |
| Hyfoama ® DSN | 3.2 g |
| Egg albumen (powder) | 2.1 g |
| Molten fat (hydrogenated coconut or palmkernel) | 43 g |
| Flavour (dissolved in fat) | 2.6 g |
| α-Lipoic acid | 1.5 g |
| Vitamin C | 0.5 g |
| Cocoa powder | 43 g |
| Water | 76 g |
| Total | 1000 g |

What is claimed is:

1. A composition comprising (i) carbohydrate; (ii) peptide material; and in addition, two free amino acids consisting of leucine and phenylalanine, wherein said peptide material is obtained by hydrolyzing protein material, said peptide material is derived from wheat protein, each free additional amino acid is present in an amount in the range of 0.2 to 20 weight percent, calculated on dry matter basis, and each said additional amino acid is distinct from any free amino acid that may be present from the peptide material.

2. The composition according to claim 1, wherein leucine and phenylalanine are present in an amount in the range of 1 to 10 weight percent calculated on dry matter basis.

3. The composition according to claim 1 or 2, wherein said composition contains another free amino acid which is selected from the group consisting of arginine and glutamine.

4. The composition according to claim 3, wherein at least one of arginine and glutamine is present as an additional free amino acid in an amount in the range of 0.1 to 20 weight percent, calculated on dry matter basis.

5. The composition according to claim 1, wherein the peptide material is derived from wheat proteins, rice proteins, pea proteins, casein proteins, whey proteins or mixtures thereof.

6. The composition according to claim 1 or 5, wherein said peptide material has an average peptide chain length in the range of 20 to 40 amino acids.

7. The composition according to claim 1 or 5, wherein said peptide material has an average peptide chain length in the range of 3 to 20 amino acids.

8. The composition according to claim 1, wherein said peptide material is present in an amount in the range of 0.1 to 50 weight percent, calculated on dry matter basis.

9. The composition according to claim 8, wherein said peptide material is present in an amount in the range of 2 to 25 weight present, calculated on dry matter basis.

10. The composition according to claim 1, wherein said carbohydrate material is selected from the group consisting of monosaccharides, disaccharides and oligosaccharides.

11. The composition according to claim 1, wherein said carbohydrate material comprises a complex edible carbohydrate.

12. The composition according to claim 11, wherein said complex edible carbohydrate comprises a maltodextrin.

13. The composition according to claim 1, wherein said carbohydrate material is present in an amount of 10 to 90 weight percent, calculated on dry matter basis.

14. The composition according to claim 13, wherein said carbohydrate material is present in an amount of 50 to 80 weight percent, calculated on dry matter basis.

15. The composition according to claim 1, wherein said composition further comprises at least one member selected from the group consisting of a vitamin, a flavor, a mineral, a lipid, and a protein.

16. The composition according to claim 15, wherein said lipid is an emulsifier.

17. The composition according to claim 1, wherein said composition has the form of an isotonic beverage or sports bar.

18. The composition according to claim 1, wherein said composition contains 10 to 90 weight percent of said carbohydrate, 0.1 to 50 weight percent of said peptide material, and 0.2 to 20 weight percent of each free amino acid, said weight percent being calculated on a dry matter basis.

19. The composition according to claim 1, wherein said composition contains 10 to 90 weight percent of said carbohydrate, 0.1 to 50 weight percent of said peptide material, and 0.2 to 20 weight percent of each free amino acid, said weight percent being calculated on a dry matter basis.

20. The composition according to claim 15, wherein said composition contains 10 to 90 wieght percent of said carbohydrate, 0.1 to 50 weight percent of said peptide material, and 0.2 to 20 weight percent of each free amino acid, said weight percent being calculated on a dry matter basis.

21. A method of feeding comprising enterally adminstering a composition according to claim 19 to a human.

22. A method of enhancing the blood insulin level comprising administering a composition according to claim 19 to a human during or following physical exercise.

23. The composition according to claim 1, wherein leucine and phenylalanine are each present in at least about 7 wt. %, calculated on a dry basis.

24. A method of enhancing the blood insulin level comprising administering a composition according to claim 1, 18 or 20 to a human during or following physical exercise.

25. A method of feeding comprising enterally administering a composition according to claim 1, 18 or 20 to a human.

* * * * *